United States Patent [19]
Marrie

[11] 3,827,640
[45] Aug. 6, 1974

[54] ELECTRIC COFFEE MILL

[75] Inventor: Paul Marrie, Dijon, France

[73] Assignee: Societe Anonyme dite "ETUD", Dijon, France

[22] Filed: Nov. 28, 1972

[21] Appl. No.: 310,087

[30] Foreign Application Priority Data
Dec. 1, 1971 France.............................. 71.043057
May 19, 1972 France.............................. 72.018024

[52] U.S. Cl............. 241/100, 241/37.5, 241/199.12
[51] Int. Cl....... A47j 42/30, A47j 42/52, B02b 7/02
[58] Field of Search............. 241/100, DIG. 4, 37.5, 241/88.1, 101.2, 199.12; 99/286

[56] References Cited
UNITED STATES PATENTS
| | | | |
|---|---|---|---|
| 2,212,883 | 8/1940 | Meeker et al...................... | 241/100 |
| 2,982,483 | 5/1961 | Heinemans........................ | 241/100 |
| 3,107,600 | 10/1963 | Brun-Buisson............... | 241/101.2 X |
| 3,191,873 | 6/1965 | Schmidt.......................... | 241/100 X |

FOREIGN PATENTS OR APPLICATIONS
151,518  3/1903  Germany.............................. 99/286

Primary Examiner—Roy Lake
Assistant Examiner—E. F. Desmond
Attorney, Agent, or Firm—Cushman, Darby & Cushman

[57] ABSTRACT

An electric coffee mill of the grinding blade type with a screen through which the ground product is removed, wherein the grain reservoir is arranged in such a way as to surmount and coaxially surround the grinding chamber which is closed at its upper end, the reservoir communicating with the chamber through two lateral, opposite openings situated at such a level that an expansion chamber is present in the upper part of the grinding chamber throughout the entire grinding operation including completion of the grinding.

22 Claims, 9 Drawing Figures

ELECTRIC COFFEE MILL

BACKGROUND OF THE INVENTION

The invention relates to an electrical coffee mill comprising a grinding blade and a screen through which the ground product is removed.

The invention is applicable in particular to coffee mills of small overall dimensions and high grinding capacity, in particular to combined coffee-making and coffee-grinding machines.

PRIOR ART

Coffee mills of the grinding-wheel or crusher type, and also of the rotary blade type are already known.

Grinding-wheel crushers advantageously enable a succession of grinding operations to be carried out in accordance with particular requirements because the coffee grains are accommodated in the reservoir inside which the grinding wheels operate. Unfortunately, it is not possible with these crushers to obtain a very finely ground product of constant grain size corresponding to the interval between the grinding-wheels, because numerous particles equivalent in size to the actual section of the tooth of a grinding-wheel always pass through.

In mills having a blade rotating in a closed bowl, the bowl contains a quantity of grains which has to be renewed with each ground batch which remains in the bowl. Although the ground material obtained is finer than that obtained in crushers, it is not free from faults. It is fine, accumulates in a heap and is heated at the bottom of the bowl with loss of aroma, and is slightly coarser at its surface.

Recent years have seen the appearance of blade mills in which the grinding bowl is replaced by a chamber incorporating a perforated wall acting as a screen. The ground material is ejected by centrifugal force when it reaches a size just below that of the mesh width of the screen. It is thus possible, by selecting a suitable mesh size, to obtain the required, substantially uniform grain size. However, in these appliances, if the grain reserve builds up to a level which is in effect sufficient for successive carrying out of several grinding operations, this quantity of grain reserve continuously imposes an increased load on the blade. There is thus required a variable power from the motor in dependence upon the prescribed quantity of grains in the reservoir. Heating of the ground material with resultant loss of aroma still occurs, above all when the reservoir has just been refilled.

OBJECT OF THE INVENTION

The object of the invention is to provide an improved blade mill incorporating a screen for the ground product in such a way as to eliminate this particular disadvantage.

BRIEF SUMMARY OF THE INVENTION

The invention relates to a coffee mill of this type and is characterised by the fact that the grain reservoir is arranged in such a way as to surmount and coaxially surround the grinding chamber which is closed at its upper end, the reservoir communicating with the chamber through two opposite lateral openings situated at such a level that an expansion zone is present in the upper part of the grinding chamber throughout the entire grinding operation, including completion thereof.

A mill of this kind can be made with the motor accommodated either at the bottom of the mill or in the upper part thereof. In the second case, the screen advantageously forms a kind of tray whose base allows the ground material through at the same time as the lateral walls.

When the motor is in operation, the blade is subjected solely to the pressure of the grain batch accommodated in the grinding chamber and which is able to expand freely upwards into the upper expansion chamber under the mixing effect of the blade, with the output required from the motor maintained at a constant level.

The grains are fed during the grinding operation by means of lateral channels and the blade receives the grain batch over its entire length so that, although the starting and mixing power required from the motor remains constant, it is nevertheless considerable.

The invention also provides an improved embodiment with a view to reducing the power required from the motor, which can thus be of lower output, the essential feature of the expansion chamber being maintained so as to allow the batch to expand freely during grinding.

The invention also relates to a blade-type electric coffee mill incorporating a screen through which the ground product is removed, characterised by the fact that the lower part of the grain reservoir is in the form of a funnel arranged axially for laterally and peripherally feeding the grains, a spherical, downwardly concave cap or any other surface with the same diverting effect upon the grains being arranged between the bottom of the hopper and the blade, the diameter of this cap being such that the grains only drop onto the ends of the blade.

In addition to reducing the overall dimensions of the mill, this arrangement considerably simplifies its design.

BRIEF DESCRIPTION OF DRAWINGS

Further structural details of the coffee mill according to the invention will become apparent from the following description in conjunction with the accompanying drawings which show three exemplary embodiments of this appliance. In the accompanying drawings.

DESCRIPTION OF EMBODIMENTS

Figure 1:
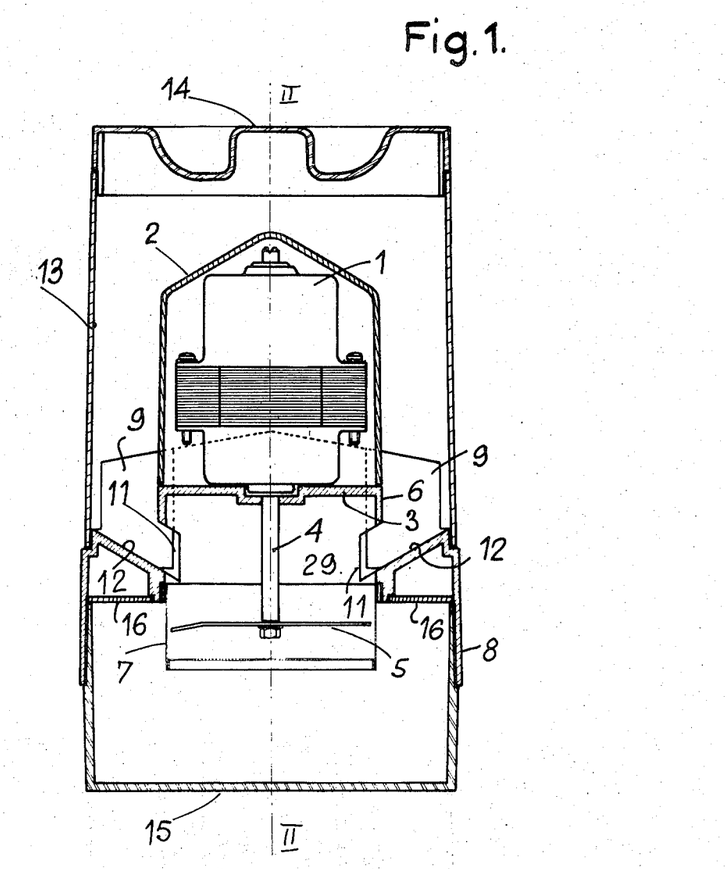
FIG. 1 is an elevation in section of a coffee mill according to the invention with the motor in the upper part of the mill.
Figure 2:
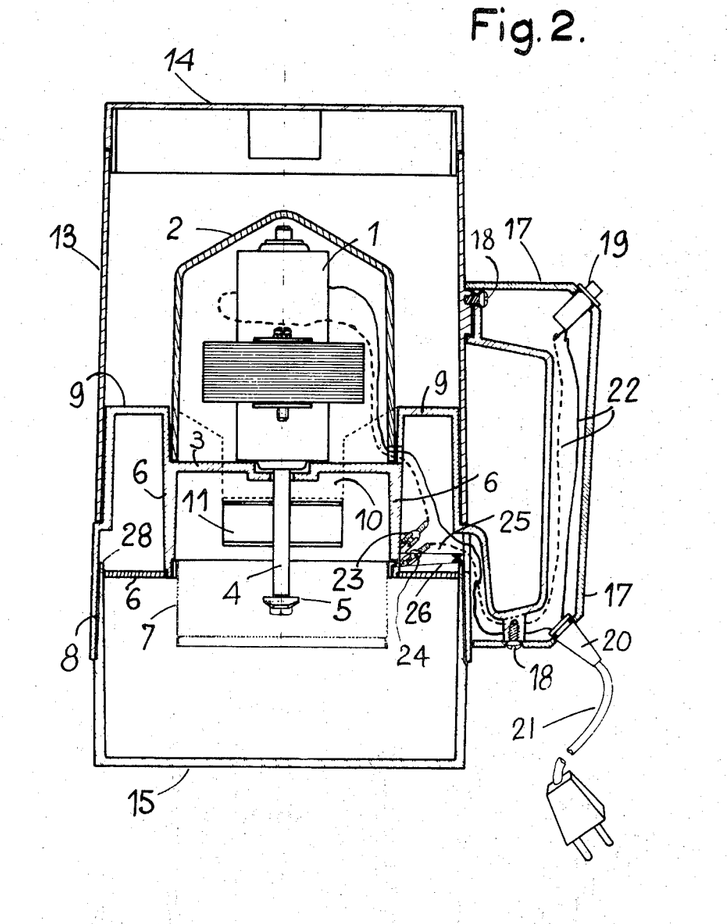
FIG. 2 is a section on the line II—II of FIG. 1.
Figure 3:
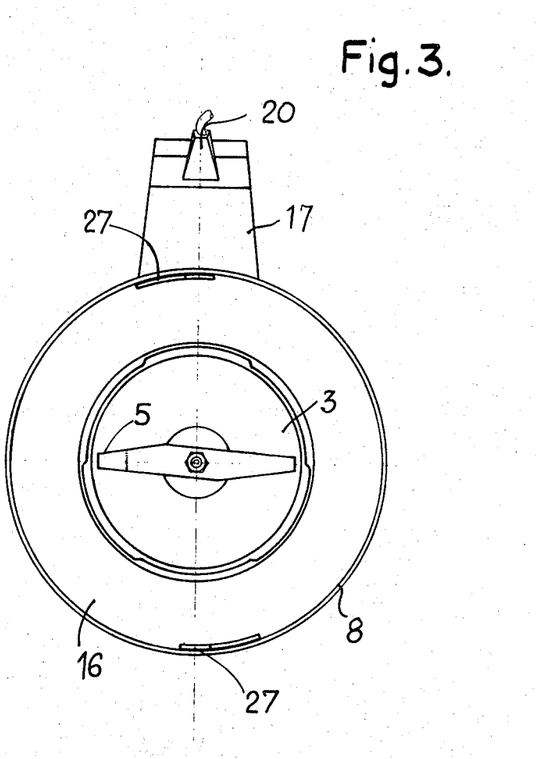
FIG. 3 is a view from beneath of the lower part of this mill following removal of the recovery box for the ground product.

As shown in FIGS. 1 and 2, the motor 1 of the mill, covered by a hood 2, rests with its hood on a circular platform 3 traversed axially by the shaft 4 of the motor, which shaft at its end drives a grindiing blade 5.

The platform 3 forms part of an assembly comprising all the active components of the mill. This assembly comprises a form of inverted cylindrical tray with an upper base formed by the platform 3 and with a lateral wall 6 axially surrounding the shaft 4. At its lower end, this inverted tray is closed by a cylindrical grinding bowl 7 made of thin perforated material so that it acts as a screen. A short cylindrical skirt 8 is arranged coaxially with and at a distance from the inverted tray, being connected to the bowl by two hollow, crescent-shaped members 9 which surround the tray in such a way that, between their ends, they form two wide, diametrically opposite openings 10 forming extensions of two corresponding diametrically opposite cutouts 11 in the wall 6 of the tray. In FIG. 1, which shows one of the crescent members 9 in its entirety, it can be seen that, on either side of the appliance, the cooperating openings 10 and 11 are shaped in such a way as to form two inclined chutes 12, and the upper surface of the crescent members defines a very open obtuse angle to ensure that the grains slide towards the chutes. The two crescent members 9 have such a height that the bottom part of the hood 2 is held between them by friction.

The top of the skirt 8 has a circular groove for accommodating the foot of a cylinder 13 which forms a coffee grain reservoir around the hood of the motor and which is closed by a cover 14. The bottom part of the skirt, whose height is such that, when the container 15 is removed, the mill is able to stand on the working surface by resting on the edge of this skirt to protect the screen, is closed by a container 15 engaging internally with the skirt, in which it rests against the lower edge of the skirt, against a flat ring of the skirt and against a flat ring 16 on which the crescent members 9 rest.

All these components, namely the skirt 8, the cylinder 13, the cover 14 and the container 15 can be interlocked by a conventional system of bayonet joints.

The inverted tray (3, 6) will generally be made of a plastics material, as will the aforementioned components, the two crescent members 9 and the flat ring 16. However, the tray (3, 6) may also be moulded from a plastics material in one piece with the cylindrical skirt 8 and the two crescent members 9, as has been assumed in FIGS. 1 and 2.

Like the mill shown in FIG. 2, the mill which has just been described is provided with a lateral, hollow handle 17 in two parts, fixed to one another and to the mill casing by screws such as 18. At its upper end, this handle carries a control switch 19 and, at its lower end, carries a socket 20 for the power cable 21, the electrical cricuit being established as follows.

The insulated wires 22, passing through the interior of the hollow handle 17, connect the switch 19, the power socket 20, the motor 1 and two terminals 23, 24, thereby forming a safety device. To this end, the two terminals, which are connected to the lower part of the wall 6, are each provided with an elastic, conductive tongue 25, 26, which tongues are only in contact when the container 15 is in position. For this purpose, the ring 16 is provided with two marginal slots 27 into which penetrate two locating profiles 28 which surmount the upper circular edge of the lateral wall of the container 15. One of these profiles lifts the contact 26 and applies it to the contact 25. When the container 15 is removed, contact is broken so that if by accident or through defective operation the switch 19 remains closed, the supply of current is automatically shut off and the blade 5 stopped.

Accordingly, a mill of this kind is used as follows.

With the container 15 in position, the cover 14 is removed and the annular space between the hood 2 and the cylinder 13 is filled with coffee grains, for example half a pound. The grains fall through the openings 10 on to the chutes 12. The cover 14 is then replaced.

The grinding chamber 29, which is formed by the space inside the screen 7 and by the internal volume of the inverted tray (3, 6), also comprises the expansion chamber defined by the platform 3 and the vertical walls 6 up to the level of the entry grooves 11. With the motor at a standstill, the coffee grains also fill this grinding chamber, but only up to the level of the cutouts 11, even if the mill is not in an exactly vertical position or if it is being handled. Accordingly, an empty space forming the expansion chamber is always present underneath the base 3 of the inverted tray.

Thus, when the motor is switched on through the switch 19, the blade 5 is subjected solely to the pressure of the batch of grains accommodated in the grinding chamber, which grains are able to expand freely upwards into the upper expansion chamber under the mixing effect of the blade, with the output from the motor remaining at a constant level.

The ground coffee whose fineness corresponds to the mesh width of the screen escapes laterally and through the bottom of this screen into the recovery container 15. The motor is stopped after a sufficient quantity of ground coffee has been collected, the chamber 19 remaining filled with grains to the same level through the regular descent of the grains accommodated in the cylindrical reservoir 13, which grains slide along the slopes formed by the upper faces of the crescent members 9.

To use the ground coffee, the container 15 is removed, which shuts off the supply of current. If the screen 7 is accidentally removed or subsequently removed for cleaning, the hand of the user cannot come into contact with a rotating grinding blade.

Figure 6:
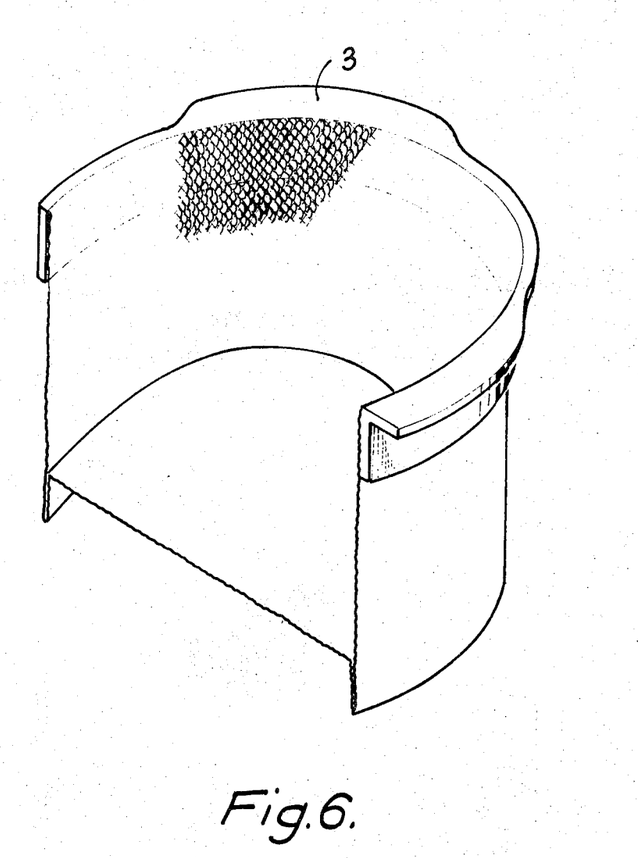
FIG. 6 is a perspective view of part of the screen of the mill shown in FIGS. 1 to 3.

The screen 7 can be made either of metal gauze or of perforated metal, more particularly of expanded metal. The advantage of expanded metal is that is provides the screen with greater optical transparency, in other words most of its surface is formed by openings rather than by metal. The grinding results obtained with expanded metal are better than those obtained with metal gauze or perforated metal, providing the following two requirements are satisfied. Firstly, the inner band of the screen should be the rough face of the band of expanded metal. Secondly, stretching should produce a curve or arc in the two sides of each diamond-shaped mesh.

An arc of this kind should have its concave face directed towards the rotating blade, in other words this face should be below the straight sides of a mesh relative to the direction of rotation of the blade.

It is this which is shown in FIG. 6, which is a perspective view in section of the expanded metal screen 7 with an enlarged view of one of the meshes, the arrow $f$ indicating the direction of rotation of the motor.

Figure 4:
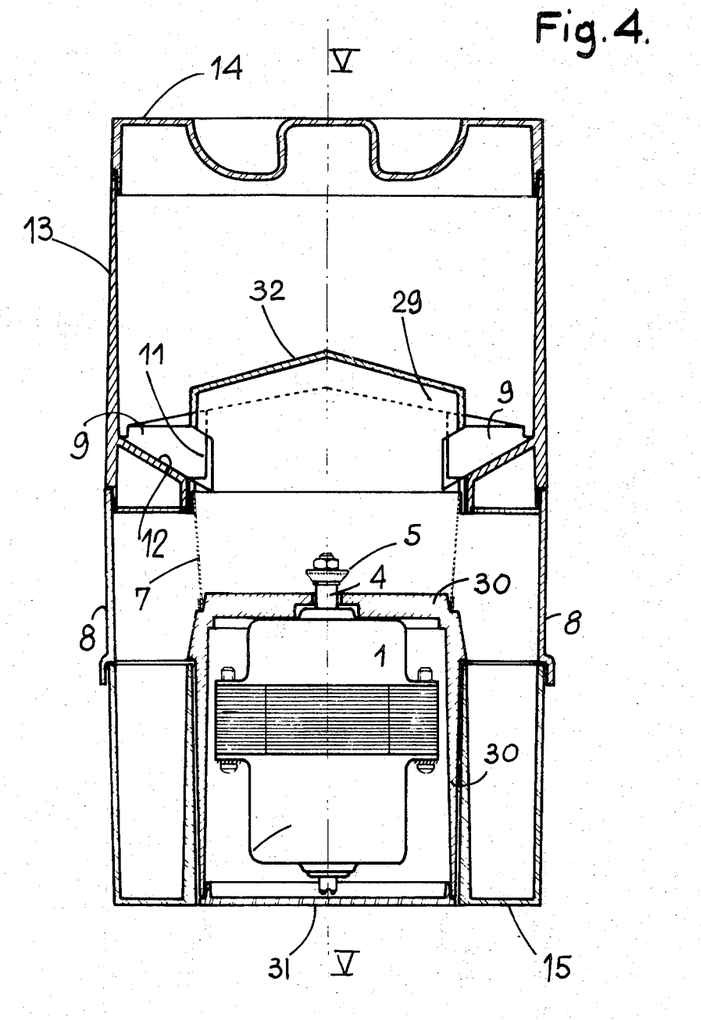
FIG. 4 is an elevation in section through a modification of the mill with the motor at the bottom of the mill.
Figure 5:
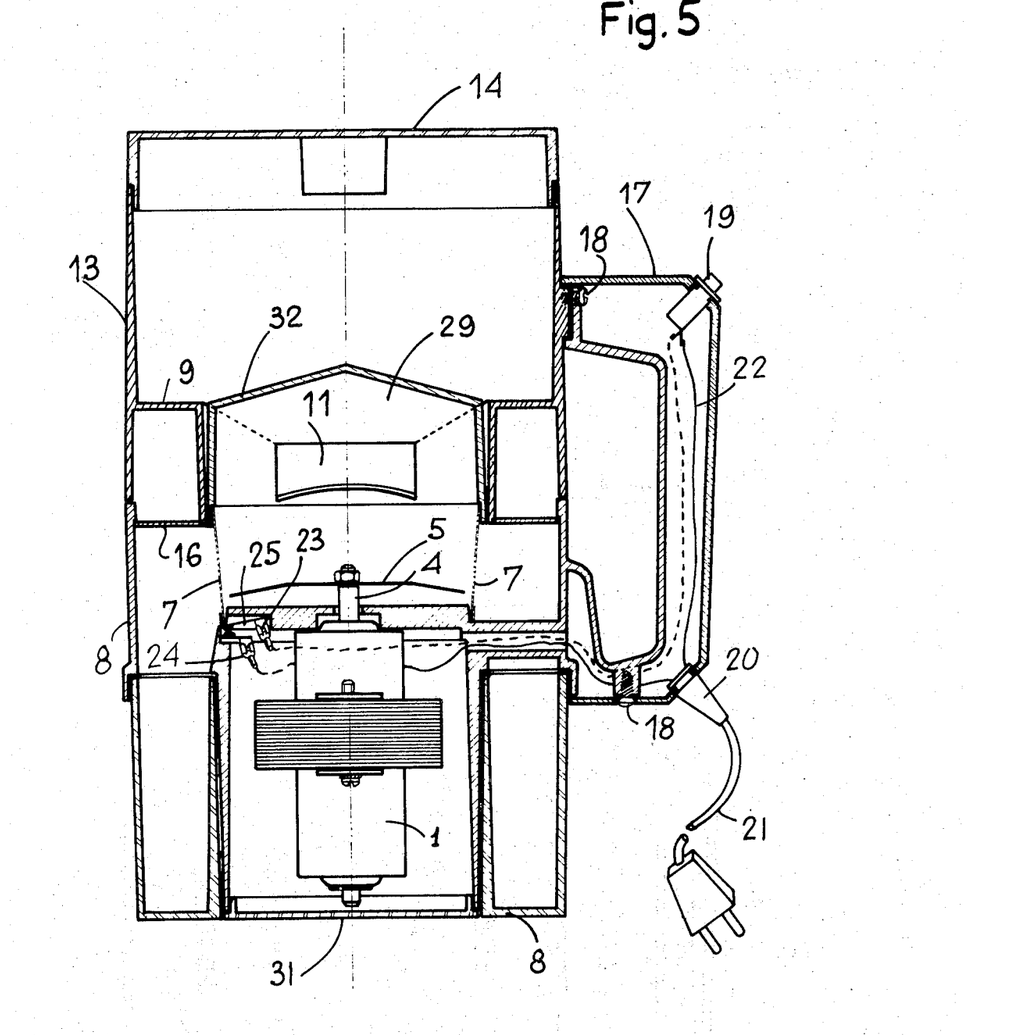
FIG. 5 is a section on the line IV—IV of FIG. 4.

The modification of the mill shown in FIGS. 4 and 5 is designed in generally the same manner as above, except that the motor 1 is arranged in the lower part of the mill. In thes Figures, the reference numerals used in FIGS. 1 to 3 are again used to denote the same components, so that the following description is confined to the few structural differences.

In this case, the motor 1 is accommodated in a cylindrical plastic hood 30 with a base plate 31 which can be made of a plastics material with a few openings in it for ventilating the motor.

The container 15 in which the ground product is collected is a cylindrical, annular container which fits around the cylindrical part of the hood 30. In this case, the automatic electric cutout is arranged on the upper, lateral part of the hood 30 from which it is suitably insulated, removal of the screen 7 actuating the automatic safety cutout.

The grinding chamber 29, formed by the inverted tray 32 supporting a very wide cylindrical or frustoconical screen 7, rests on the upper surface of the hood 30. The two crescent members 9 surrounding the tray 32 may either be separate from one another or can be moulded in one piece with th cylindrical wall 13 of the grain reservoir, as has been assumed in FIGS. 4 and 5.

Finally, although not shown in the drawing, the upper base of the tray 32, which is widely open and conical in shape to enable the grains to slide down, is designed to support, axially of the mill, a metal rod forming a vortex in the alignment of the shaft 4 of the motor.

It should be noted that, in a mill according to the invention, irrespective of its detailed construction, the descent of the grains and the high rotational speed of the blade tend to generate a supercompression in the bottom part of the mill by comparison with the upper part. Although there is nothing in this to interfere with the regular flow of the grains, it can be overcome through a decompression vent, i.e. through one or more small lateral orifices through which the atmospheres in the lower and upper parts of the mill communicate with one another.

Figure 7:
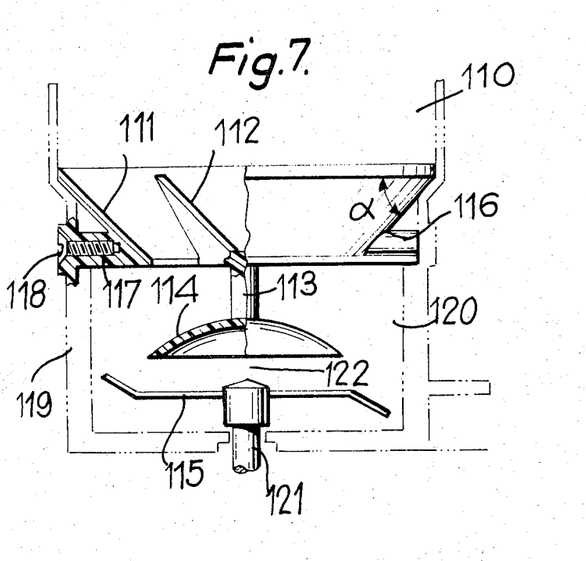
FIG. 7 is a simplified elevation in half-section of the active components of the mill according to the invention.
Figure 8:
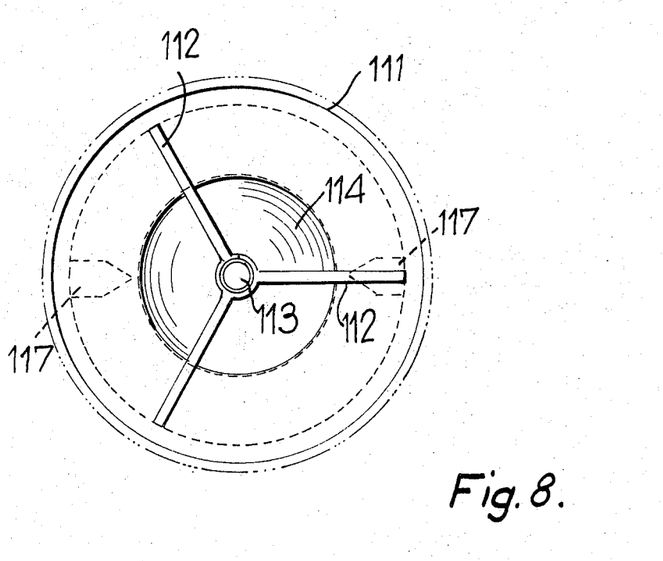
FIG. 8 is a view from above.

As shown in FIGS. 7 and 8, the grain reservoir 110 terminates at its lower end in a funnel 111, whose walls have a cone angle $\alpha$, preferably of from 45° to 60°. Three flanges 112 are fixed to the inner wall of this funnel at an angular spacing of 120° acting as support to an axle 113, from whose lower end is suspended a spherical cap 114 with its concave surface directed downwards, i.e. towards the grinding blade 113.

The assembly comprising the funnel, the flanges, the axle and the spherical cap can with advantage be moulded in one piece from a plastics material. The funnel is provided at its base with a thick collar 116 comprising bores 117 which enable it to be fixed by means of screws 118 to the wall 119 of the mill casing shown in interrupted lines.

The inclination $\alpha$ of the walls of the funnel is selected so that the coffee grains are channeled towards the foot of the axle 113. They then slide on to the cap 114, which thus distributes the grains towards the periphery of the grinding chamber 120 where they are caught and ground by the end segments of the blade 115. Accordingly, that part of this blade situated immediately below the cap 114 remains substantially free from grains, with the result that the starting and grinding energy required from the motor mounted on the axle 121 is greatly reduced.

The space between the cap 114 and the blade 115, remaining substantially free from grains, thus forms the expansion chamber 112 required for the free expansion of the ground material during grinding.

The diameter at the base of the spherical cap is slightly greater than the diameter of the outlet orifice of the funnel so that no ground coffee is thrown back into the funnel towards the end of a grinding operation.

Tests have shown that a mill according to the invention is at its most effective when the vertical distance between the base of the funnel and the blade is equal to at least three times the distance between the base of the cap and the blade. It is also important, so far as regular distribution of the grains is concerned, that the cap should be fixed solely in the immediate vicinity of its apex, and the method of suspension described above ideally satisfies this requirement, since the axle 113 may be made as thin as possible.

Finally, the surface 114 need not necessarily be spherical in shape. A conical surface with a very wide opening would also be suitable, as would any other surface allowing regular distribution of the grains by sliding from the axle 113 to the periphery of the grinding chamber 120.

Figure 9:
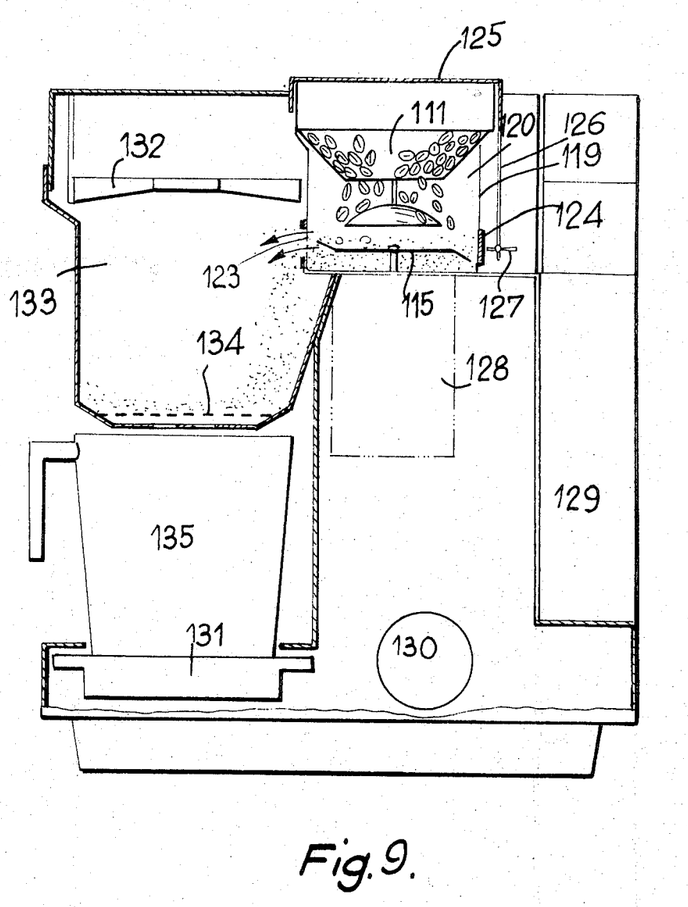
FIG. 9 is an elevation of a combined coffee-making and coffee-grinding machine equipped with the mill according to the invention.

It is thus possible economically to produce a highly effective mill with small overall dimensions, including the motor, and this mill is particularly suitable for equipping conventional types of combined coffee-making and coffee-grinding machines. FIG. 9 diagrammatically illustrates a combined machine of this kind equipped with a mill according to the invention.

In this combination, the ground coffee passes laterally from the mill into the coffee-making section, the arrangement of a mill according to the invention being as follows and as illustrated in FIG. 9. The wall 119 of the mill is surrounded at the level of the blade by a ring 124, which, by rotating about its own axis, can cover or uncover a grille 123 adapted to allow the ground coffee thrown against it by centrifugal force to pass through by a screening effect. The position of the ring 124 is regulated by the user who, to this end, turns the cover 125 of the mill which, through a vertical rod 126, entrains an arm 127 integral with the ring.

The other components shown in FIG. 9 form part of a known arrangement: 128 is the mill motor; 129 is the water reservoir which feeds a heat pump 131 after passing through a water softener 130. The heat pump removes hot water at the upper end of the coffee-making machine where it is distributed over the perforated cover 132, flows through the ground material discharged through the grille 123 into the jar 133; the liquid coffee flows through the screen 134 into the collecting pot 135.

I claim:
1. An electric coffee mill comprising
   a grinding chamber closed at its upper end;
   a rotary grinding blade in said chamber;
   a screen through which ground coffee is removed from the grinding chamber;
   a coffee grain reservoir surmounting and coaxially surrounding the grinding chamber; and
   means communicating said reservoir with said chamber, said communicating means comprising two opposed lateral openings positioned at such a level that an expansion chamber is present in the upper part of the grinding chamber throughout the entire grinding operation, including completion thereof.

2. A mill as claimed in claim 1, wherein the motor is arranged in the upper part of the mill and th screen is in the form of a tray which allows the ground material to escape through the base and through the lateral walls.

3. A mill as claimed in claim 1, wherein the motor is arranged at the bottom of the mill.

4. A mill as claimed in claim 3, wherein the grinding chamber is formed by an inverted tray whose lateral walls are extended by the screen for the ground product.

5. A mill as claimed in claim 4, wherein the grinding chamber is closed at its lower end by the upper surface of the motor casing.

6. A mill as claimed in claim 4, wherein each opening for the passage of the grains from the reservoir to the grinding chamber is in the form of a sloping-base chute formed by a cutout in the lateral wall of the inverted tray cooperating with the interval between the adjacent ends of two crescent-shaped members arranged between the inverted dish and the outer wall of the grain reservoir, the upper surface of each of these crescent members forming sloping surfaces down which the grains flow towards the chutes.

7. A mill as claimed in claim 6, wherein the upper part of the grinding chamber above the chutes remains free from grains when the motor is stopped.

8. A mill as claimed in claim 2, wherein the cylindrical box for collecting the ground product fits into a skirt extending the outer wall of the grain reservoir.

9. A mill as claimed in claim 3, wherein the cylindrical, annular container for collecting the ground product is fitted around a cylindrical casing accommodating the motor and fits into a skirt extending the outer wall of the grain reservoir.

10. A mill as claimed in claim 1, wherein the screen for the ground product is made of metal gauze, perforated metal or preferably of expanded metal.

11. A mill as claimed in claim 1, including a hollow handle which carries the motor control switch and the power socket, the electrical circuit additionally comprising a safety cutout which is opened by the removal of the collecting container or of the screen.

12. A mill as claimed in claim 1, wherein the lower part of the grain reservoir is in the form of a funnel arranged axially for laterally and peripherally feeding the grains, a cap, having a shape allowing regular distribution of the grains by sliding to the periphery of said grinding chamber, being arranged between the bottom of the funnel and the blade, the diameter of said cap being such that the grains only drop onto the ends of the blade.

13. A mill as claimed in claim 12, wherein the cap or the grain-diverting surface is suspended at its peak from an axle centered beneath th funnel by radial, angularly equidistant flanges resting on the walls of the funnel.

14. A mill as claimed in claim 13, wherein the funnel, the flanges, the axle and the cap are moulded in one piece from a plastics material.

15. A mill as claimed in claim 12, wherein at its base the funnel carries an outer collar with radial bores which enable the funnel to be fixed by screws to the mill casing.

16. A mill as claimed in claim 12, wherein the wall of the funnel is inclined through 45° to 60° to the horizontal.

17. A mill as claimed in claim 12 wherein said cap has a spherical, downwardly concave shape.

18. A mill as claimed in claim 12, wherein the vertical distance between the base of the funnel and the blade is equal to at least three times the distance between the base of the cap and the blade.

19. A mill as claimed in claim 12, wherein the screen through which the ground product is removed is in the form of a grille incorporated in the cylindrical lateral wall of the mill casing, this grille being designed to be blocked by an encircling ring and to rotate around the cylindrical wall of the mill.

20. A mill as claimed in claim 19, wherein the position of the ring is regulated by turning the cover of the mill connected by a vertical rod to an arm integral with the ring.

21. A mill as claimed in claim 17 wherein the diameter at the base of the cap is slightly greater than the diameter of the outlet opening of the tunnel.

22. A mill as claimed in claim 12 wherein said cap has a conical shape, the base of the cone facing said blade.

* * * * *